F. W. MACKEY.
WATER MOTOR.
APPLICATION FILED JAN. 9, 1908.
924,808.
Patented June 15, 1909.
5 SHEETS—SHEET 2.
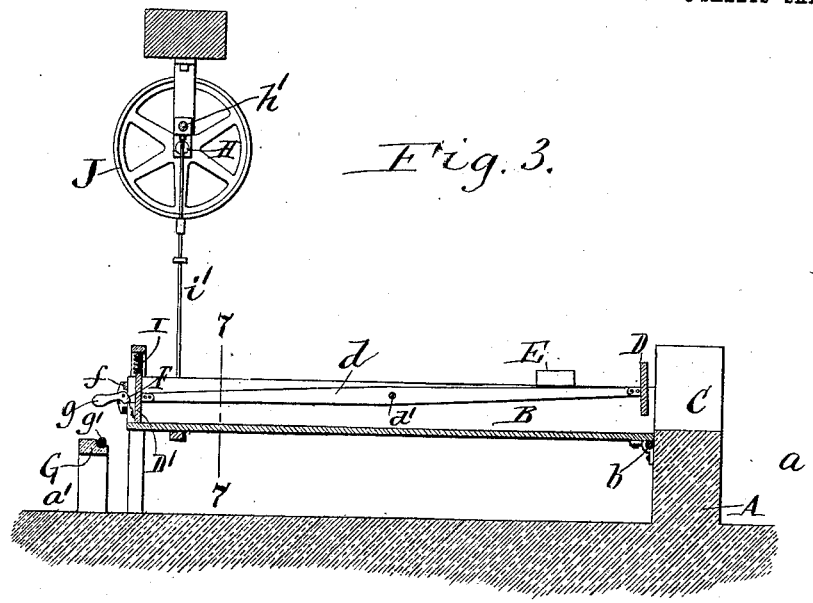
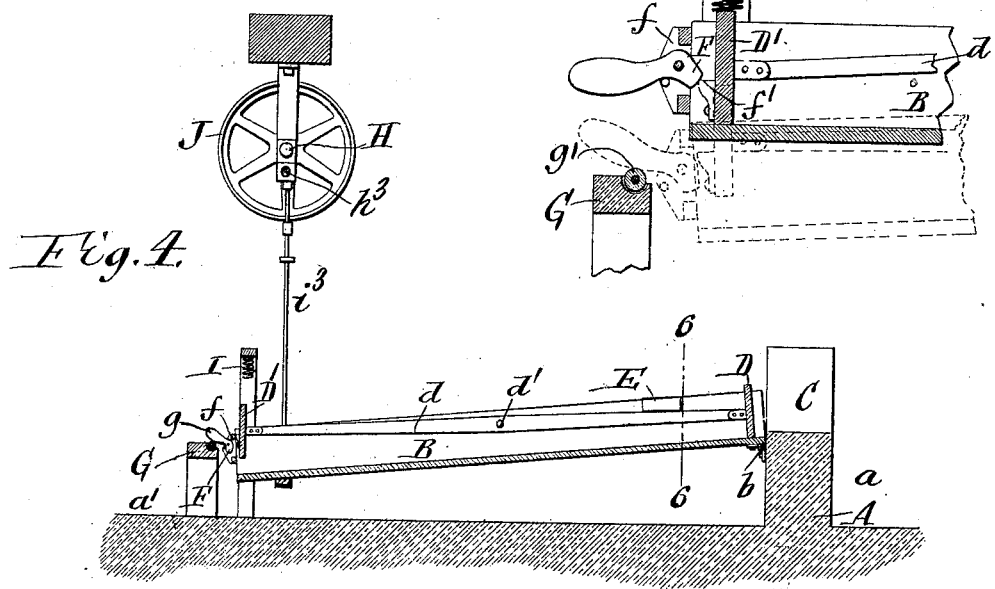
Witnesses:—
Richard Sommer.
Gustav W. Nora.
Inventor
Floyd W. Mackey
by Geyer & Popp
Attorneys.

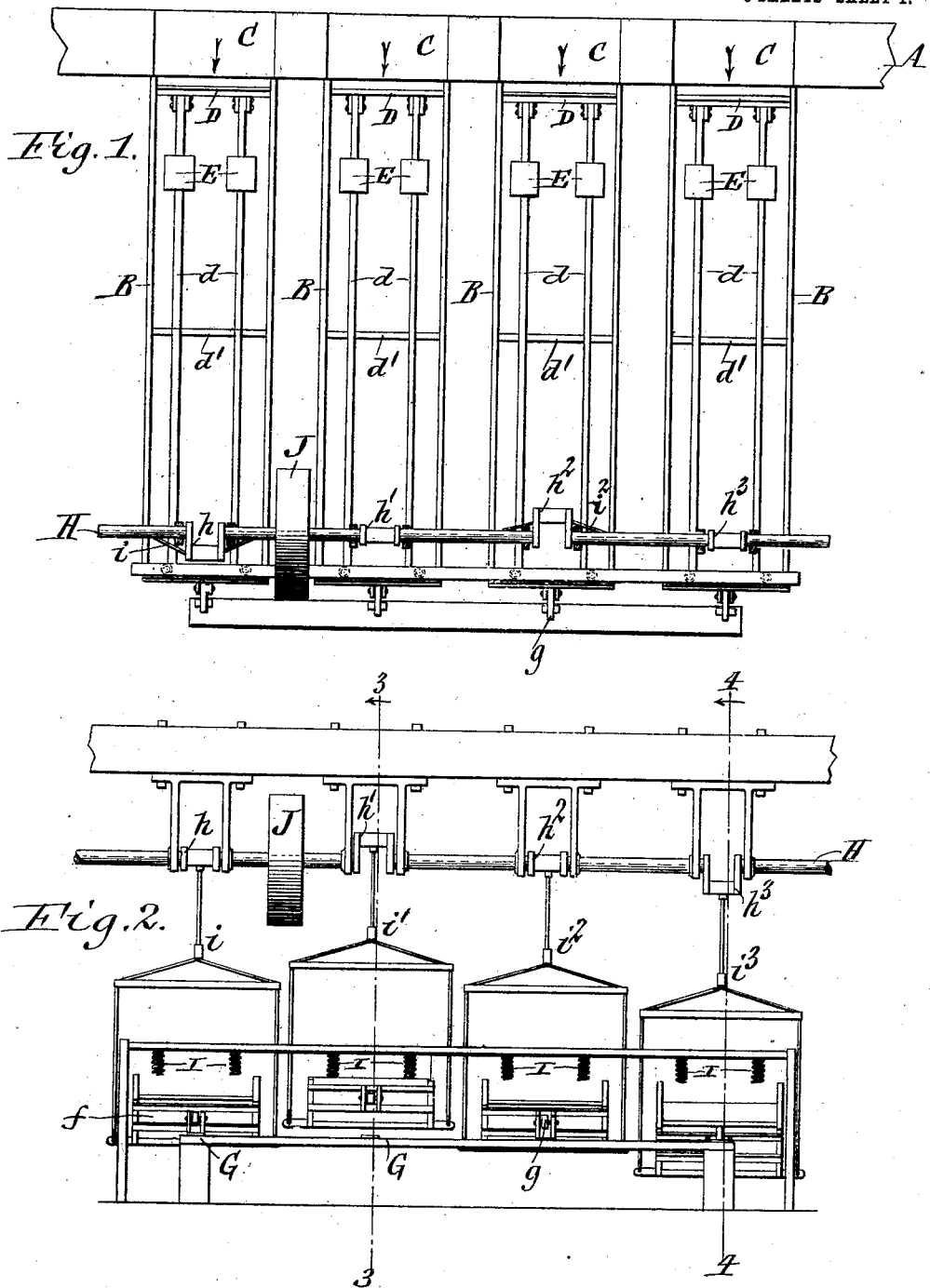

F. W. MACKEY.
WATER MOTOR.
APPLICATION FILED JAN. 9, 1908.
924,808.
Patented June 15, 1909.
5 SHEETS—SHEET 3.
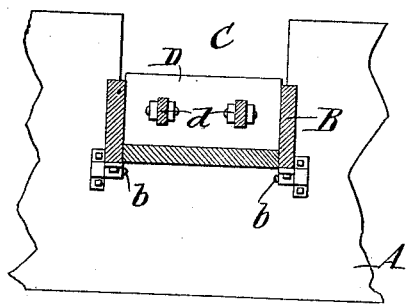
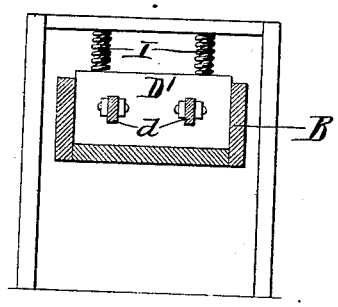
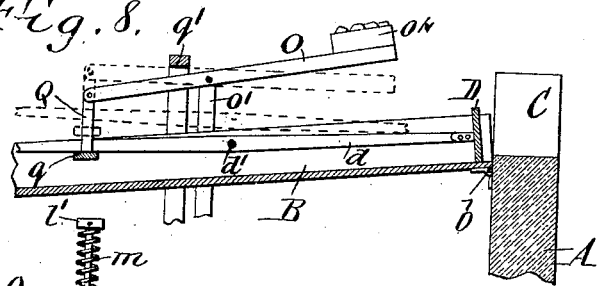
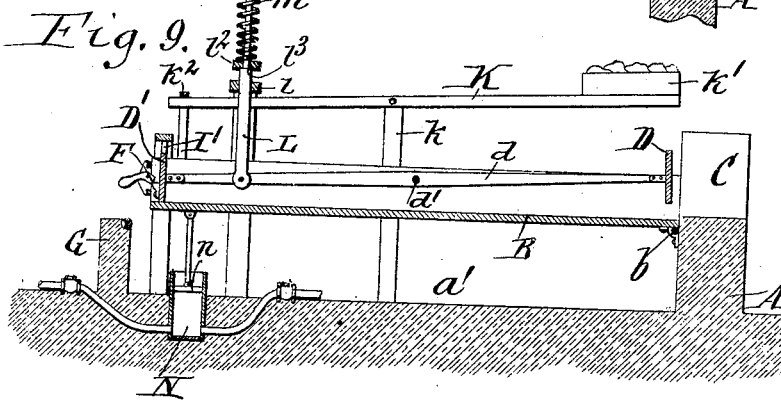
Witnesses:
Richard Sommer
Gustav W. Nora
Inventor
Floyd W. Mackey
by Geyer & Popp
Attorneys

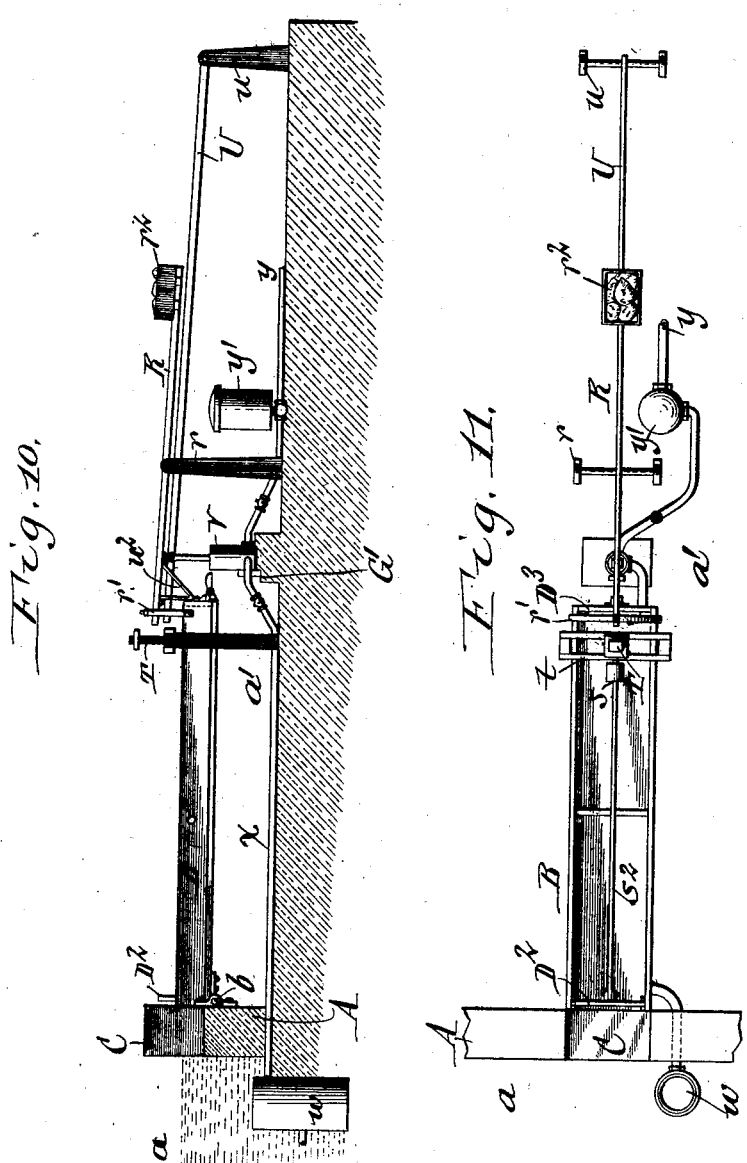

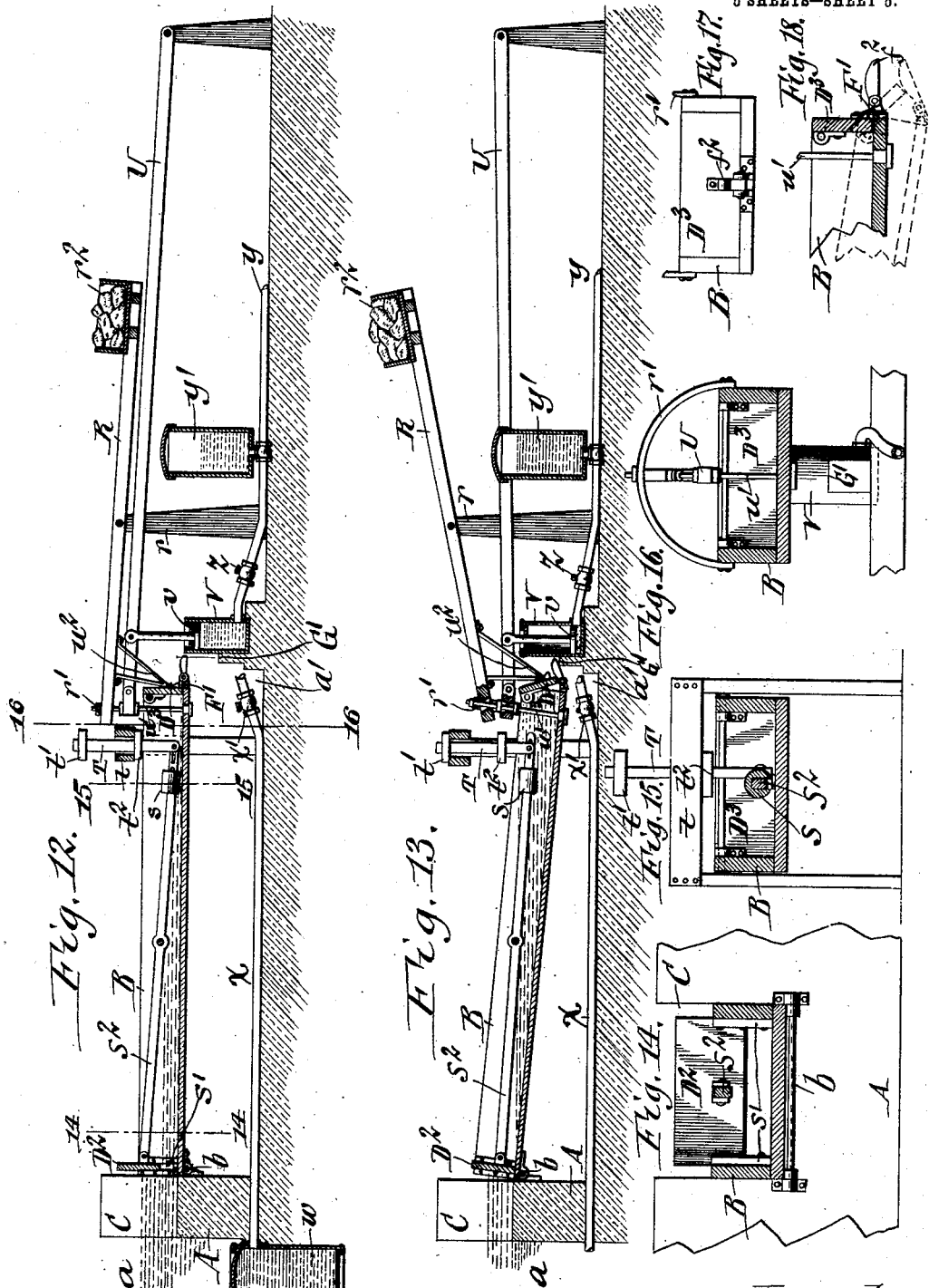

UNITED STATES PATENT OFFICE.

FLOYD W. MACKEY, OF SILVER CREEK, NEW YORK, ASSIGNOR OF ONE-HALF TO AVERY A. MACKEY, OF SILVER CREEK, NEW YORK.

WATER-MOTOR.

No. 924,808.  Specification of Letters Patent.  Patented June 15, 1909.

Application filed January 9, 1908. Serial No. 409,908.

*To all whom it may concern:*

Be it known that I, FLOYD W. MACKEY, a citizen of the United States, and resident of Silver Creek, in the county of Chautauqua and State of New York, have invented a new and useful Improvement in Water-Motors, of which the following is a specification.

This invention relates to that class of water motors in which power is derived from water by intermittently admitting a quantity of the same into a movable trough for depressing the latter and discharging this water therefrom to permit a counter-balancing or return device to again lift the trough after the same has been emptied.

It is the object of this invention to provide a motor of this type which is simple, inexpensive and reliable in construction, which can be operated by a comparatively small fall in the water supply and which is not liable to get out of order.

In the accompanying drawings consisting of 5 sheets: Figure 1 is a top plan view of my improved water motor adapted more particularly for obtaining a large amount of power. Fig. 2 is an end elevation of the same. Figs. 3 and 4 are vertical longitudinal sections taken in the correspondingly numbered lines in Fig. 2. Fig. 5 is a fragmentary longitudinal section, on an enlarged scale, showing the means for operating and controlling the outlet gate at the tail of the water trough. Figs. 6 and 7 are vertical transverse sections, on an enlarged scale, in lines 6—6 and 7—7, Figs. 4 and 3, respectively. Fig. 8 is a fragmentary vertical longitudinal section showing a modification of the means for operating the inlet and outlet gates of the trough. Fig. 9 is a vertical longitudinal section showing another modified construction of my improved water motor. Figs. 10 and 11 are a side elevation and a top plan view showing another modification of my invention. Figs. 12 and 13 are vertical longitudinal sections, on an enlarged scale, of my improved water motor shown in Figs. 10 and 11 and representing the parts in different positions. Figs. 14, 15 and 16 are vertical transverse sections, on an enlarged scale, taken in lines 14—14, 15—15 and 16—16, Fig. 12, respectively. Fig. 17 is a rear end elevation of the water trough and the outlet gate thereof. Fig. 18 is a fragmentary vertical longitudinal section of the tail end of the water trough, its outlet gate and the catch for holding this gate in its closed position.

Similar letters of reference indicate corresponding parts throughout the several views.

Referring to Figs. 1-7, A represents a dam which is erected between the elevated reservoir or water supply $a$ from which the water for running the motor is drawn and the depressed spill way or tail race $a^1$ which carries away the water after the same has been used in the motor. B represents a plurality of vertically oscillating water troughs which are arranged transversely side by side over the spill way. Each of these troughs is pivoted at its head end by means of a hinge $b$ or otherwise so as to be capable of swinging vertically and is open at its head and tail ends so as to form an inlet for the water at the head of the trough and an outlet therefor at the tail of the same. Opposite the inlet of each trough the dam is provided with a sluice or water passage C whereby the water is conducted from the elevated water supply into the trough. D represents a vertically movable inlet gate or valve which is adapted to open and close the inlet of each trough and $D^1$ is a vertical movable outlet gate or valve which is adapted to open and close the outlet of each trough. The gates of each trough are operated so that they open and close the inlet and outlet of the respective trough alternately. The means shown in Figs. 1-7 for this purpose consist of a pair of vertically swinging gate rock levers $d$ arranged lengthwise in the trough and pivoted centrally by a transverse rod $d^1$ to the side walls thereof while their front and rear ends are connected respectively with the inlet and outlet gates. From this construction it is obvious that when the inlet gate is opened to admit the water into the trough the outlet gate will be closed so as to confine the water in the trough, while upon raising the outlet gate for permitting the load of water to discharge from the trough the inlet gate will be lowered and closed to prevent new water from entering the trough at this time. The front arms of the gate levers are preferably provided with weights E so that the normal tendency of these levers is to swing in the direction for closing the inlet gate and opening the outlet gate. When the trough is elevated into a position for receiving a load of water it is arranged substantially horizontal and in this position the gate levers are turned so that the outlet gate is lowered and closed and the inlet gate is raised and opened, as shown in Fig. 3, thereby permitting the water to pass from the reservoir or supply into the trough. The gates and their levers are held in this position by means of a catch F pivoted at its upper end to a cross piece or bracket $f$ secured to the tail of the trough and engaging its lower end with a block or shoulder $f^1$ on the rear side of the outlet gate. As the trough gradually becomes filled with water it descends under the weight of the same and during the last part of this downward movement of the same the catch, is released from the outlet gate, permitting the weights E to turn the gate levers quickly and open the outlet gate and close the inlet gate, as shown in Fig. 4, thereby permitting the water to escape from the trough and preventing new water at this time from passing into the trough. Although various means may be employed for releasing the catch from the outlet gate that shown in Figs. 1–5 is suitable for this purpose and comprises an abutment G arranged in rear of the trough in position to be engaged by a tail $g$ on the catch during the last portion of the downward movement of the trough and cause the catch to be disengaged from the outlet gate. The abutment is preferably provided with an anti-friction roller $g^1$ with which the tail of the catch engages, thereby reducing the wear on these parts.

After the water has been emptied from the trough the latter together with the parts mounted thereon is again elevated by a lifting or a counter-balancing device which may be variously constructed. When a plurality of water troughs are employed in a single motor the same are so connected and timed relatively to each other that while one or more troughs are descending under the weight of the load of water in the same they operate to lift one or more of the water troughs which have previously been emptied. In Figs. 1–4 a water motor is shown embodying four troughs and means are provided for causing the same to rise and fall in succession and to cause the empty troughs to be lifted by the descending filled troughs. The means shown consist of a horizontal crank shaft H journaled transversely in suitable bearings over the several troughs and provided with cranks $h, h^1, h^2, h^3$ over the several troughs which are arranged on different quarters and hangers or yokes $i, i^1, i^2, i^3$ each of which is connected at its upper end with one of the cranks and at its lower end with the tail end of one of the troughs. From this construction it will be apparent that two of the cranks of the shaft will be pulled downwardly on one side of the center of rotation by the weight of the water in their troughs while the two cranks are moving upwardly on the opposite side of the shaft and raising the empty troughs connected therewith. During the last part of the upward movement of each trough its gates and levers are so turned that its outlet gate is closed and its inlet gate is opened. The preferred means for this purpose consists of an abutment or stop I, arranged above the tail of the trough and adapted to engage with the upper edge of the outlet gate during the last portion of the upward movement of the trough. As the trough and outlet gate approach the upper end of their movement the outlet gate engages first with the stop I and is arrested in its movement in that direction while the tail end of the trough continues to rise, thereby causing the trough to close against the outlet gate. The instant this occurs the catch is swung forwardly over the shoulder $f^1$ by the weight of its tail, thereby holding the outlet gate in its closed position preparatory to confining the next load of water in the trough whereby the subsequent depression thereof is effected. The stop or abutment I is preferably made yielding by constructing the same in the form of springs, as shown in Figs. 2, 5 and 7, thereby avoiding the necessity of accurate adjustment of the parts and also preventing jarring when the outlet gate strikes the stop.

The power generated by this motor may be transmitted to the place of consumption by any suitable means, for instance, by means of a belt passing around a driving pulley J on the shaft.

Instead of employing a plurality of water troughs in the motor which are so organized that the filled troughs lift the empty ones, a water motor embodying my invention may be constructed with but a single water trough. This last mentioned construction however requires a separate device for again lifting the water trough after the same has been depressed by the water and emptied. The lifting device for this purpose shown in Fig. 9 consists of a lifting lever K arranged lengthwise over the trough and pivoted centrally on standards $k$ to swing a weight $k^1$ mounted on the front arm of the lifting lever, and a yoke or bail $k^2$ connecting the rear arm of the lifting lever with the tail of the trough. The weight $k^1$ is raised as the trough is depressed by the load of water in the same and when the water is discharged from the trough the weight descends and raises the trough into its receiving position.

Instead of employing the weights E shown in Figs. 1, 3 and 4 for turning the gate levers in the direction for closing the inlet gate and opening the outlet gate, this may be effected by the means which are shown in Fig. 9 and which are constructed as follows:—L is an upright shifting rod passing through a stationary cross piece $l$ and connected at its lower end with the rear arm of the gate supporting lever, an upper collar or shoulder $l^1$ secured to the upper end of said rod, a lower collar $l^2$ mounted to slide on said rod above the cross piece but limited in its downward movement on said rod by means of a shoulder $l^3$ on the latter and a spring $m$ surrounding the upper part of the rod and bearing at its opposite ends against the upper and lower collars. As shown in Fig. 9, the water trough is in its elevated position, the inlet gate is open, the outlet gate is closed and the shifting rod L is so arranged that its lower collar $l^2$ is elevated above the cross piece $l$, whereby the spring $m$ is permitted to expand to its fullest extent and without exerting any upward pull or lifting effect on the rear arm of the gate supporting lever. The spring $m$ remains in this condition during the first part of the downward movement of the water trough and until the lower collar $l^2$ engages with the upper side of the cross piece. During the continued downward movement of the water trough together with the shifting rod the spring $m$ is compressed between the upper and lower collars whereby an upward pull is exerted on the rear arm of the gate supporting lever. This pull operates to instantly open the outlet valve and close the inlet valve during the last part of the downward movement of the water trough at which time the catch F is disengaged from the outlet gate. In this last mentioned construction of my improved water motor, the tail end of the water trough is connected on its under side with the piston $n$ of a pump cylinder N whereby the rising and falling motion of the trough may be utilized for pumping water or other liquids. During the last portion of the subsequent upward movement of the trough under the action of the spring $m$ the outlet gate engages with a fixed stop $I^1$ causing the outlet gate of the trough to be closed and held in this position by the catch ready for the next power or working stroke of the trough.

If desired, the gate shifting device may be organized to employ a weight to open the outlet gate and close the inlet gate, such a structure being shown in Fig. 8 and constructed as follows:—O represents a gate shifting lever arranged lengthwise above the gate supporting levers and pivoted centrally on posts $o^1$ so as to turn vertically. On its front arm the gate shifting lever is provided with a weight $o^2$ and on its front arm this lever is provided with a tappet Q having an upwardly facing shoulder $q$ which is adapted to be engaged by the front arm of the gate supporting lever. When the water trough is in its elevated position the shoulder of the tappet is out of engagement from the rear arm of the gate supporting lever, as shown in Fig. 8, the tappet being held in this position by means of a stop $q^1$ which limits the movement of the lifting lever under the action of its weight $o^2$. During the first part of the downward movement of the trough under its load of water the gate shifting lever remains unaffected but during the last part of the downward movement of the same the rear arm of the gate supporting lever engages with the shoulder of the tappet of the shifting lever and causes the latter to be turned in the direction for lifting its weight, thereby producing an upward pull on the rear arm of the gate supporting lever. When the catch F is released from the outlet gate during the last part of the downward movement of the trough, the weight $o^2$ owing to its upward pull on the rear arm of the gate supporting lever quickly opens the outlet gate and closes the inlet gate. During the last part of the upward movement of the trough the outlet gate is closed and the inlet gate is opened and the upward movement of the lifting lever O is arrested so that the gate lever leaves the shoulder of the tappet.

The means shown in Figs. 8 and 9 for operating the gates relieves the trough, when loaded with water, from the counter balancing effect of the gate shifting device during the first part of the downward stroke of the trough and only restrains the downward movement of the trough during the last portion thereof sufficient to produce a tension on the gates and cause them to be shifted quickly for discharging the load in the trough and preventing water from entering the trough at this time.

If desired the inlet and outlet valves or gates of the trough may be operated independently of each other, and the trough lifting lever may be arranged otherwise than above the trough. An organization embodying such a modification of my invention is shown in Figs. 10–17 and constructed as follows:—R represents a lifting lever arranged lengthwise opposite the tail end of the water box and pivoted centrally on a post $r$ so as to turn in a vertical plane. The front arm of this lever is connected with the tail of the trough by a bail $r^1$ and the rear arm thereof is provided with a weight $r^2$ which turns the lifting lever in the direction for raising the trough when the same is empty. $D^2$ represents the inlet gate which in this case slides vertically in ways $s^1$ at the head or front end of the trough. This gate is normally held in its open position by means of a gate lever $s^2$ pivoted centrally on the trough and connected with its front arm to the inlet gate while its rear arm is provided with a weight $s$. T represents an upright tappet rod or bar connected at its lower end with the rear arm of the gate lever $o^2$ and passing with its upper part through an opening in a cross piece $t$ and provided above and below said cross piece with tappets $t^1$, $t^2$ which are separated a greater distance than the vertical thickness of said cross piece. When the trough is raised, as shown in Fig. 12, the lower tappet engages the underside of the cross piece and holds the inlet gate in its open position. During the first part of the downward movement of the trough the inlet gate remains in this position until the upper tappet $t^1$ has engaged the upper side of the cross piece after which the continued downward movement of the trough causes the inlet gate to be closed, as shown in Fig. 13. During the upward movement of the trough, after being emptied, the inlet gate is closed until the last portion of this movement at which time the lower tappet $t^2$ strikes the underside of the cross piece and turns the gate lever in the direction for opening the inlet gate. In this modified construction the outlet gate $D^3$ is pivoted at its upper end to the tail of the trough so as to swing lengthwise of the same at its lower end and it is held in a vertical position across the outlet of the trough so as to close the same by means of a catch $F^1$ pivoted on the lower part of the tail end of the trough. As the trough descends a tail $f^2$ on the catch engages with a stationary abutment $G^1$ and thereby releases the catch from the outlet gate, permitting the latter to be pressed rearwardly by the water and causing the trough to be emptied of its contents. The closing of the outlet valve is effected by means of a shifting finger or angle arm $u^2$ depending from the underside of the front arm of the lifting lever and adapted to engage with the rear side of the outlet gate and press the same forwardly into its closed position during the upward movement of the trough and closing lever. When thus closed the catch $F^1$ is automatically swung by its tail into engagement with the outlet gate and holds the same shut preparatory to receiving the next charge of water. In this last mentioned construction of water motor embodying my invention the same is represented as operating a water supply system comprising a beam or lever U arranged lengthwise in rear of the trough and pivoted to swing vertically at its rear end on posts $u$ while its front end is connected by a rod $u^1$ with the tail end of the trough a pump cylinder V containing a plunger or piston $v$ connected with the beam U, a water filter or reservoir $w$ connected with the pump cylinder by a pipe $x$ containing a check valve $x^1$ and a delivery pipe $y$ connected with the pump cylinder and a pressure tank $y^1$ and provided with a check valve $z$.

My improved water motor is exceedingly simple in construction and not liable to get out of order when exposed to the elements as devices of this character often have to be and the same can also be operated to advantage in places which furnish a fall of water so small that it has been incapable of utilization for power heretofore.

I claim as my invention:

1. A water motor comprising a vertically oscillating water trough having an inlet at one end and an outlet at its opposite end and gates or valves mounted on the trough and operating to control said inlet and outlet.

2. A water motor comprising a vertically oscillating water trough having an inlet at one end and an outlet at its opposite end, gates or valves mounted on said trough and controlling said inlet and outlet, and means operating to open and close said gates alternately.

3. A water motor comprising a vertically oscillating trough pivoted at its head and having an inlet at its head and an outlet at its tail, gates mounted on the trough and controlling said inlet and outlet, and means for opening and closing said gates alternately.

4. A water motor comprising a dam having a sluice, a vertically oscillating water trough pivoted at its head adjacent to said sluice and having an inlet at its head and an outlet at its tail, inlet and outlet gates controlling said inlet and outlet, and means for opening and closing said gates alternately.

5. A water motor comprising a dam having a sluice, a vertically oscillating water trough pivoted at its head adjacent to said sluice and having an inlet at its head and an outlet at its tail, inlet and outlet gates controlling said inlet and outlet, and means for closing the inlet gate and opening the outlet gate when the trough is in its lowered position and vice-versa when the trough is raised.

6. A water motor comprising a vertically oscillating water trough having an inlet at its head and an outlet at its tail and adapted to be depressed by the water flowing into the same, a counter-balancing device connected with said trough for raising the same when empty, and gates or valves mounted on the trough and controlling the inlet and outlet thereof.

7. A water motor comprising a vertically oscillating water trough pivoted at its head and having an inlet at its head and an outlet at its tail, an inlet gate for closing said inlet, an outlet gate for closing said outlet, a catch adapted to hold said outlet gate in its closed position, and means for disengaging said catch from the outlet gate in the depressed position of the trough.

8. A water motor comprising a vertically oscillating water trough pivoted at its head and having an inlet at its head and an outlet at its tail, an inlet gate for closing said inlet, an outlet gate for closing said outlet, a catch adapted to hold said outlet gate in its closed position and having a tail, and an abutment with which said tail is adapted to engage in the depressed position of the trough for opening the outlet gate.

9. A water motor comprising a vertically oscillating trough pivoted at its head and having an inlet at its head and an outlet at its tail, vertically movable inlet and outlet gates for controlling said inlet and outlet, respectively, and a rock lever connected at opposite ends with said inlet and outlet gates.

10. A water motor comprising a vertically oscillating trough pivoted at its head and having an inlet at its head and an outlet at its tail, vertically movable inlet and outlet gates for controlling said inlet and outlet, respectively, and a rock lever mounted on said trough and connected at opposite ends with said inlet and outlet gates.

11. A water motor comprising a vertically oscillating trough pivoted at its head and having an inlet at its head and an outlet at its tail, vertically movable inlet and outlet gates for controlling said inlet and outlet, respectively, a rock lever mounted on said trough and connected at opposite ends with said inlet and outlet gates, and a weight mounted on said lever on that side of its pivot with which the inlet gate is connected.

12. A water motor comprising a vertically oscillating trough pivoted at its head and having an inlet at its head and an outlet at its tail, vertically movable inlet and outlet gates for controlling said inlet and outlet, respectively, and a stop which closes said outlet gate and opens the inlet gate during the upward movement of the trough.

13. A water motor comprising a vertically oscillating trough pivoted at its head and having an inlet at its head and an outlet at its tail, vertically movable inlet and outlet gates for controlling said inlet and outlet, respectively, a rock lever pivoted on the trough and connected with said gates, and a stop which is engaged by said outlet gate during the upward movement thereof.

14. A water motor comprising a vertically oscillating trough pivoted at its head and having an inlet at its head and an outlet at its tail, vertically movable inlet and outlet gates for controlling said inlet and outlet, respectively, a rock lever pivoted on the trough and connected with said gates, and a yielding stop which is engaged by said outlet gate during the upward movement thereof.

Witness my hand this 3d day of January, 1908.

FLOYD W. MACKEY.

Witnesses:
MABEL A. SCHIFFERLI,
GEO. E. TOWNE.